United States Patent [19]
Hollis et al.

[11] 3,849,203
[45] Nov. 19, 1974

[54] METHOD FOR PRODUCING BATTERY TERMINAL

[75] Inventors: Norman E. Hollis; Gottfried W. Jutte; Frank I. McCartney, all of Indianapolis, Ind.; John V. McHugh, Evanston, Ill.

[73] Assignee: The Richardson Company, Des Plaines, Ill.

[22] Filed: Aug. 31, 1973

[21] Appl. No.: 393,511

Related U.S. Application Data
[63] Continuation of Ser. No. 199,453, Nov. 17, 1971, abandoned.

[52] U.S. Cl............................ 136/135 S, 136/176
[51] Int. Cl. ........................................... H01m 1/02
[58] Field of Search............ 136/134 R, 135 S, 168, 136/175, 176

[56] References Cited
UNITED STATES PATENTS

| | | | |
|---|---|---|---|
| 2,151,650 | 3/1939 | Breisch | 136/168 |
| 2,906,804 | 9/1959 | Rigsby | 136/134 R |
| 3,285,785 | 11/1966 | Shannon | 136/168 |
| 3,336,164 | 8/1967 | Miller | 136/134 R |
| 3,457,118 | 7/1969 | Miller | 136/135 S |
| 3,607,441 | 9/1971 | Mix | 136/135 S |
| 3,644,149 | 2/1972 | Coffey et al. | 136/135 S |
| 3,736,191 | 5/1973 | Blandford | 136/135 S |

*Primary Examiner*—Donald L. Walton
*Attorney, Agent, or Firm*—John L. Hutchinson; Alan M. Abrams; Robert E. Sloat

[57] ABSTRACT

This invention relates to a side wall terminal for a storage battery. The terminal includes a specially designed lead bushing adapted to be inserted through a side wall opening from the inside of the battery case. A portion of the bushing projects beyond the outside surface of the case and is surrounded by a lead locking ring. Disposed within the bushing is a hard, wear-resistant, internally threaded metallic nut used in connecting the terminal to an external cable. By means of a spinning operation the outer edge of the bushing is forced down and over the locking ring forming an integral assembly between the terminal and the side wall of the battery.

2 Claims, 4 Drawing Figures

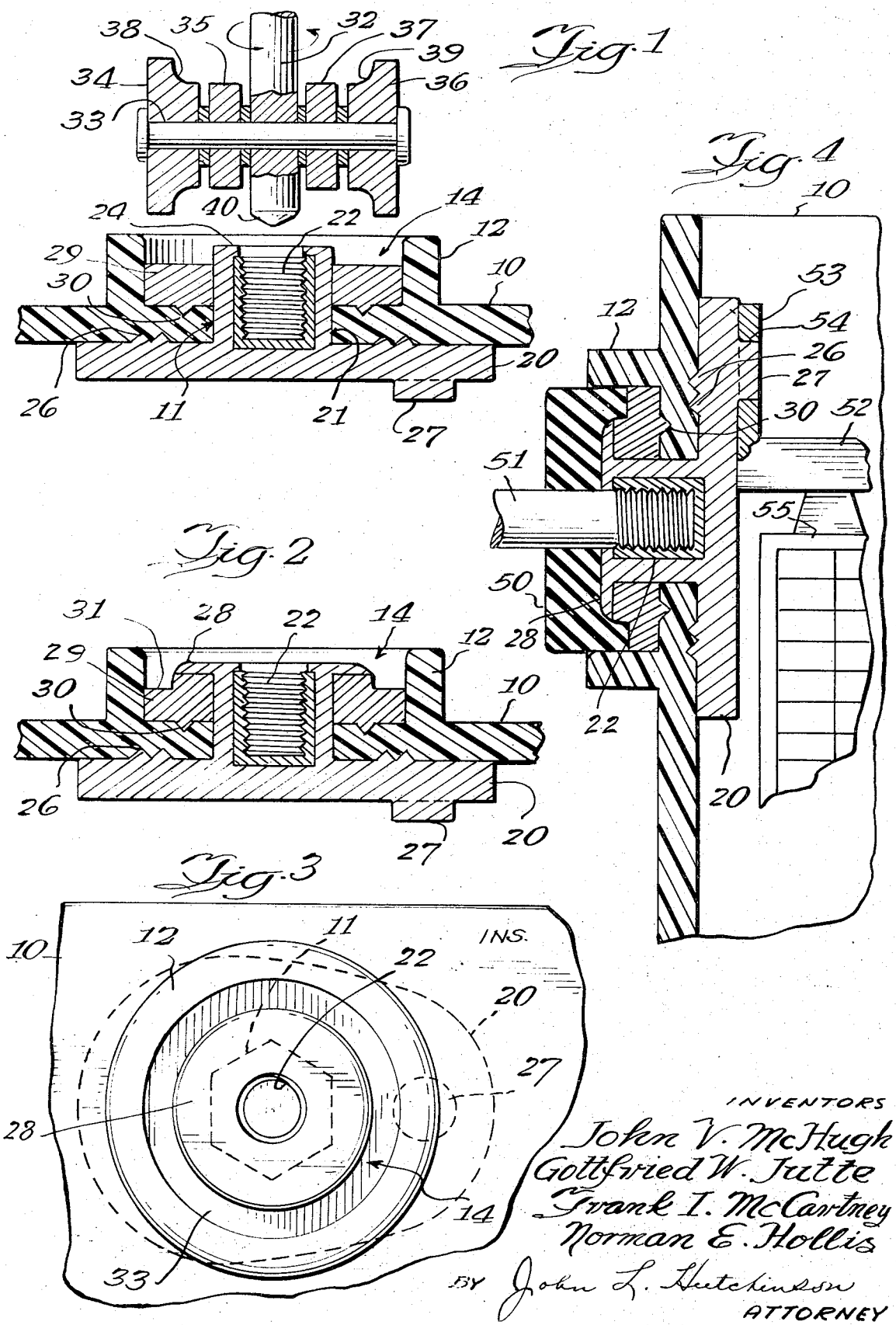

METHOD FOR PRODUCING BATTERY TERMINAL

This is a continuation, or application Ser. No. 199,453, filed Nov. 17, 1971, now abandoned.

Storage batteries, such as the twelve volt automotive battery, are provided with terminals to which cables are connected for distribution of power. For the most part the terminals, which are connected to the battery plates, have projected upwardly through the cover of the battery. Recently it has been deemed advantageous to project the terminals through the side wall of a battery case rather than through the cover.

Accordingly, the present invention is concerned with side wall battery terminals and, more particularly to a new design and assembly for such terminals.

IN THE DRAWING

FIG. 1 is a partial elevation, partly in section, of a battery terminal assembly as described herein showing its relationship just prior to being formed as an integral unit by a swaging operation.

FIG. 2 is a partial elevation, in cross section, showing the terminal elements formed as an integral assembly.

FIG. 3 is a partial elevation showing the terminal assembly from the outside of a battery case.

FIG. 4 is a partial elevation, partly in cross section, showing the battery terminal assembly as connected to a battery cable and cell plates.

Turning to the drawings, and initially to FIG. 1, the numeral 10 designates the side wall of a battery case which may be made by suitably molding a variety of natural or synthetic non conductive plastic materials, such as rubber, polyethylene or polypropylene. The wall 10 is provided with a transverse opening 11. Preferably, opening 11 will have a non circular multi-side perimeter, such as a hexagon shape. Surrounding the opening 11 on the outside surface of the side wall 10 is an integral circular flange 12 forming a recess 14.

The main terminal body includes a base 20 having formed integral therewith a laterally extending hollow bushing 21. Both base 20 and bushing 21 are made of lead and the composite element may be shaped in a single molding operation. The bushing should be formed with a configuration which conforms to opening 11 in the side wall 10 which, as indicated, is preferably multi-sided. Base 20 is a somewhat enlarged member in order to provide adequate contact with all plate leads, as further described hereinafter, and also to insure firm support for the terminal assembly in its relationship with the side wall.

Enclosed by and held firmly within the bushing is an internally threaded nut 22 which, preferably is formed of a hard, wear resistant metal such as stainless steel. The outer edge 24 of bushing 21 should extend slightly over the outer edge of the nut 22 to assist in retaining the latter in place.

On the side of the base 20 which will be in contact with the inner side of wall 10 may be provided a plurality of relatively small (¼ inch or less) projections, preferably in the form of a ring disposed concentrically about bushing 21. These projections will become imbedded in the side wall during installation of the terminal and serve as a means to assist in retaining the terminal in position in the side wall. On the inner surface of base 20 is provided a lug 27 which is used in connecting cell plate terminals to the base, as further described hereinafter.

Disposed within the recess 14 formed by circular flange 12 and surrounding bushing 21 is a lead locking member 29, generally in the shape of a ring. On the underside of locking ring 29 is provided one or more projections 30, similar to projections 26 of base 20, and adapted to become imbedded in the outer surface of wall 10 when the terminal is in final assembled position.

The elements of the terminal are mechanically locked in assembled position by a swaging action developed by means of a specially designed tool illustrated in FIG. 1.

The swaging tool consists of a central rotor 32 attached to a suitable source of power, now shown, and provided with a transversely disposed rod or axle 33. Secured to the rod 33 are a plurality of freely rotatable swagging wheels 34, 35, 36 and 37. As is illustrated, wheels 35 and 37 have substantially flat peripheries while wheels 34 and 36 have their peripheries formed with concave surfaces 38 and 39, respectively. The lower end 40 of rotor 32 is tapered, as shown to permit partial insertion into the cavity containing nut 22, and thereby assist in aligning the swaging tool with the terminal elements.

In order to permanently fix the terminal assembly into the side wall 10, the preliminary assembly of elements is placed beneath the swaging tool as illustrated in FIG. 1. The rotor 32, connected to a source of power, is rotated at high speed and then lowered toward the assembly. Freely rotatable wheels 34, 35, 36 and 37 will make contact with the surface of locking ring 29 and the outer edge 24 of bushing 21. Under continued downward pressure from the swaging tool and as a result of the heat buildup from the high speed rotation, the lead of locking ring 29 and the end 24 of bushing 21 will be deformed and molded into the shape shown in FIGS. 2 and 3. The end 24 of bushing 21 will be elongated and extend over a portion of locking ring 29 as shown at 28. Locking ring 29 will, simultaneously, be formed with a peripheral depression 31 corresponding to the non-concave part of the periphery of wheels 34 and 36 of the swaging tool. During the swaging operation a suitable support, not shown, will be inserted into the battery case immediately beneath the undersurface of body 20 to permit support for the assembly and case.

After the terminal assembly has been permanently secured in position within the side wall of a battery case, it may then be connected to the plates of a cell and a cable as shown in FIG. 4. The cable 51 is provided with a thread portion corresponding to the threads of nut 22. A covering 50, formed of rubber or suitable material may be used to seal the terminal metal surface if desired. Although the assembly is connected to the cable by complimentary threads in the nut 22 and on the end of the cable, it will be appreciated that other suitable connections can be employed between the cable and the wear-resistant "nut" such as a bayonet joint or a snap action fit.

In each cell a plurality of plates 55 are attached to a common terminal element, normally having a horizontal leg 52 and a vertical leg 53. The latter leg is provided with an opening 54 adapted to fit over lug 27 of base 20. The connection between lug 27 and leg 53 may be made permanent by "burning" wherein the two members are fused together.

While there has been shown and described an exemplary embodiment of the invention, various modifications may be made within the basic concept disclosed.

We claim:

1. A method for producing a terminal member for a battery case adapted for making connections between an external cable and plates of a battery cell; said terminal comprising an enlarged base provided with a bushing extending laterally from one surface of said base, a locking ring member positioned so that said bushing passes through said ring member, a lip formed from said bushing and in contact with a said ring member, and a peripheral depression in said ring member; which method comprises swaging on said bushing and locking ring member producing friction and resulting heat to deform: (1) said bushing to form said lip; and (2) said locking ring member to form said peripheral depression.

2. The method according to claim 1 wherein said bushing extends through a wall of a battery case and said locking member ring.

* * * * *